United States Patent
Masiewicz (10) Patent No.: US 9,530,436 B1
(45) Date of Patent: Dec. 27, 2016

(54) METHODS AND SYSTEMS FOR PROVIDING DATA SECURITY IN DATA STORAGE DEVICES

(75) Inventor: John C. Masiewicz, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1004 days.

(21) Appl. No.: 13/162,863

(22) Filed: Jun. 17, 2011

Related U.S. Application Data (60) Provisional application No. 61/372,946, filed on Aug. 12, 2010.

(51) Int. Cl.
*G06F 12/00* (2006.01)
*G11B 5/02* (2006.01)
*G11B 5/012* (2006.01)
*G06F 3/06* (2006.01)

(52) U.S. Cl.
CPC .............. *G11B 5/02* (2013.01); *G11B 5/012* (2013.01); *G06F 3/0631* (2013.01); *G06F 3/0676* (2013.01); *G06F 3/0679* (2013.01)

(58) Field of Classification Search
CPC .... G06F 3/0631; G06F 3/0676; G06F 3/0679; G06F 12/00; G11B 5/02; G11B 5/012
See application file for complete search history.

(56) References Cited

U.S. PATENT DOCUMENTS

| | | | |
|---|---|---|---|
| 7,119,980 B2 | 10/2006 | Bandic et al. | |
| 7,154,628 B2 | 12/2006 | Davis | |
| 7,228,379 B2 | 6/2007 | Bress et al. | |
| 7,349,118 B2 | 3/2008 | Zipprich et al. | |
| 7,490,357 B2 | 2/2009 | Cho et al. | |
| 7,512,812 B2 | 3/2009 | Sohn | |
| 2003/0103288 A1 | 6/2003 | Suzuki | |
| 2004/0268073 A1 | 12/2004 | Morisawa | |
| 2005/0228938 A1 | 10/2005 | Khare et al. | |
| 2005/0257017 A1 | 11/2005 | Yagi | |
| 2006/0149916 A1* | 7/2006 | Nase | 711/173 |
| 2006/0232874 A1* | 10/2006 | Tsuchinaga | G11B 5/012 360/75 |
| 2006/0236409 A1 | 10/2006 | Kuehnel et al. | |
| 2007/0208915 A1 | 9/2007 | Tran et al. | |
| 2008/0028141 A1 | 1/2008 | Kalos et al. | |
| 2008/0046998 A1 | 2/2008 | Cromer et al. | |
| 2008/0140909 A1* | 6/2008 | Flynn et al. | 711/100 |
| 2008/0155275 A1 | 6/2008 | Natarajan et al. | |
| 2008/0243538 A1 | 10/2008 | Stockton | |
| 2008/0263271 A1 | 10/2008 | Kishi et al. | |
| 2008/0263274 A1 | 10/2008 | Kishi et al. | |
| 2009/0063596 A1 | 3/2009 | Nasu et al. | |
| 2009/0172269 A1* | 7/2009 | Song et al. | 711/103 |
| 2010/0030809 A1* | 2/2010 | Nath | 707/104.1 |

(Continued)

*Primary Examiner* — Charles Rones
*Assistant Examiner* — Tian-Pong Chang
(74) *Attorney, Agent, or Firm* — Chang & Hale LLP (57) ABSTRACT

A data storage device comprising a storage media and a controller is disclosed. The controller is configured to receive a write command including a logical address and new data associated with the logical address, to write the new data to a new physical address on the storage media, and to remove old data associated with the logical address from an old physical address on the storage media, wherein the new physical address and the old physical address are different.

10 Claims, 7 Drawing Sheets

(56) References Cited

U.S. PATENT DOCUMENTS

| | | | | |
|---|---|---|---|---|
| 2010/0232057 A1* | 9/2010 | Sanvido et al. | ............ | 360/78.04 |
| 2010/0325373 A1* | 12/2010 | Kawamura et al. | .......... | 711/154 |
| 2011/0055458 A1* | 3/2011 | Kuehne | ........................ | 711/103 |
| 2011/0119498 A1* | 5/2011 | Guyot | ...................... | G11B 5/09 |
| | | | | 713/189 |
| 2011/0145481 A1* | 6/2011 | Yeh | .............................. | 711/103 |
| 2011/0231623 A1* | 9/2011 | Goss et al. | ................... | 711/159 |
| 2011/0304939 A1* | 12/2011 | Hirata et al. | ................ | 360/110 |
| 2012/0303868 A1* | 11/2012 | Tucek | .......................... | 711/103 |

* cited by examiner

METHODS AND SYSTEMS FOR PROVIDING DATA SECURITY IN DATA STORAGE DEVICES

CROSS-REFERENCE TO RELATED APPLICATIONS

The present application claims priority from provisional U.S. Patent Application Ser. No. 61/372,946, filed on Aug. 12, 2010, the specification of which is incorporated herein by reference.

BACKGROUND

Data storage devices are commonly used to store data in computers, data bases, digital video recorders, and other devices. A data storage device includes a storage media for storing data such as one or more disks, non-volatile semiconductor memory or other type of storage media. A data storage device may write data to and read data from the storage media in response to write/read commands from a host that uses the data storage device for data storage.

For data security purposes, a user may wish to remove sensitive data from the data storage device to prevent unauthorized access to the data.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
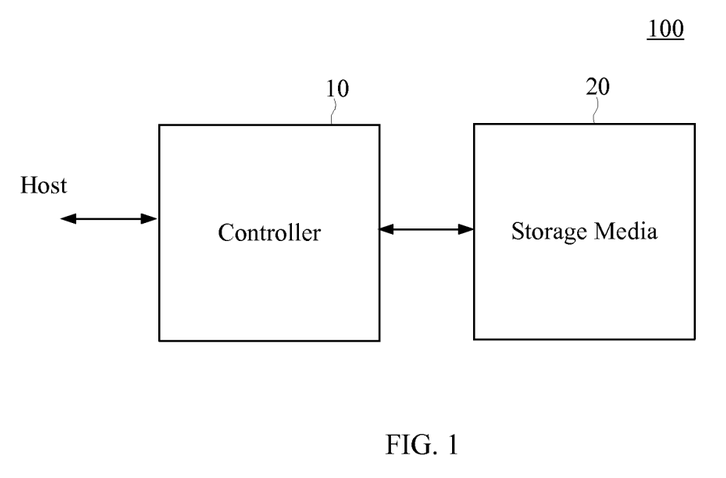
FIG. 1 is a block diagram of a data storage device according to an embodiment of the present invention.

FIG. 1 shows a data storage device 100 according to an embodiment of the present invention. The data storage device 100 comprises a storage media 20 and a controller 10. The storage media 20 may include one or more disks, non-volatile semiconductor memory, or other type of storage media. The controller 10 is configured to write data to and read data from the storage media 20 based on write/read commands from a host, which uses the data storage device 100 to store data. The controller 10 may interface with the host according to a serial advanced technology attachment (SATA) or other standard.

The controller 10 may be implemented using one or more processors for executing instructions and may further include memory, such as a volatile memory (e.g., DRAM) or non-volatile memory, for buffering data and/or storing instructions. The instructions may be executed by the one or more processors to perform the various functions of the controller 10 described herein. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

The host may address data in write/read commands to the data storage device 100 using logical block addresses (LBAs). The controller 10 may maintain an address table mapping the LBAs from the host to physical addresses (e.g., physical block addresses) of the corresponding data on the storage media 20. When the controller 10 receives a read command from the host requesting data at certain LBAs, the controller 10 uses the address table to determine the physical addresses of the requested data on the storage media 20. The controller 10 reads the requested data from the physical addresses on the storage media 20 and sends the read data to the host. The use of LBAs allows the host to address data stored in the data storage device 100 without having to know the physical addresses of the data on the storage media 20.

The controller 10 may employ direct addressing and/or indirect addressing. Indirect addressing may also be referred to as dynamic mapping or other terminology.

In direct addressing, the controller 10 stores data associated with a particularly LBA at the same physical address on the storage media 20. As a result, when the host writes new data to an LBA, the old data on the storage media 20 associated with the LBA is overwritten with the new data. This allows a user to remove old data associated with an LBA from the storage media 20 by sending a write command to the controller 10 to write new data to the LBA, thereby overwriting the old data with the new data.

In indirect addressing, the controller 10 stores data associated with a particular LBA at different physical addresses on the storage media 20. As a result, when the host writes new data to an LBA, the new data is written to a new physical address that is different from the physical address of the old data associated with the LBA. Indirect addressing creates a problem if a user wishes to remove old data associated with an LBA from the storage media 20. This is because, when the user sends a write command to the controller 10 to write new data to the LBA, the controller 10 does not overwrite the old data associated with the LBA with the new data. Instead, the controller 10 writes the new data to a different physical address on the storage media 20, leaving a copy or "footprint" of the old data on the storage media 20. The old data may eventually be overwritten; however, there is no assurance that this will occur. In cases were security is critical, significant amounts of sensitive data may remain on the storage media 20.

Various embodiments of the present invention address the security problems associated with indirect addressing. In one embodiment, when the host writes new data to an LBA, the controller 10 also removes the old data associated with the LBA from the storage media 20 to ensure that a "footprint" of the old data is not left on the storage media 20. The controller 10 may remove the old data by overwriting the old data with all ones, all zeros or a pattern of bits. The controller 10 may also perform garbage collection before overwriting the old data, as discussed further below.

Figure 2:
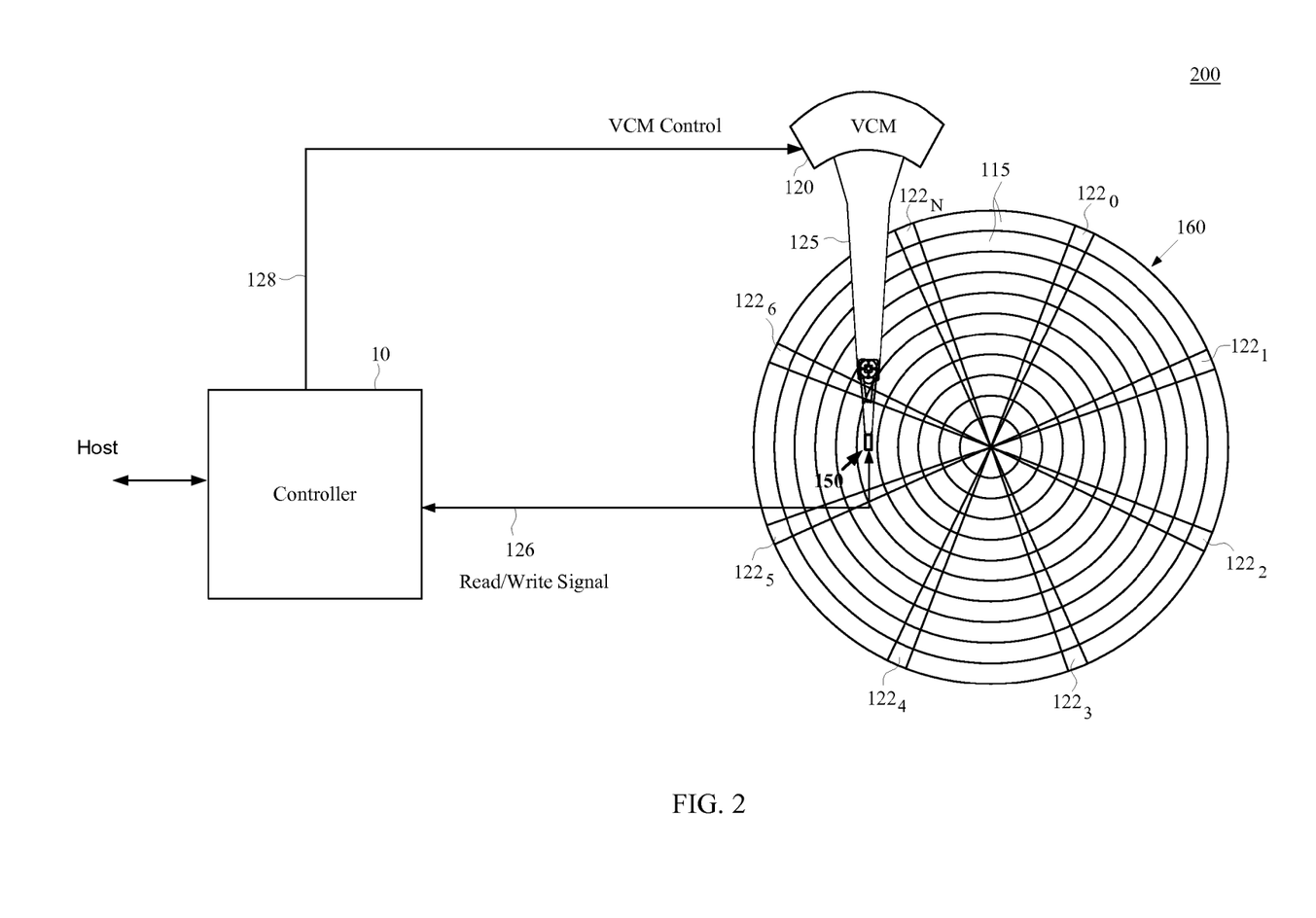
FIG. 2 is a block diagram of a disk drive according to an embodiment of the present invention.

FIG. 2 shows a disk drive 200 in which secure writes may be performed according to various embodiments of the present invention The disk drive 200 comprises a rotating magnetic disk 160 and a head 150 connected to the distal end of an actuator arm 125. The head 150 magnetically writes data to and reads data from the disk 160. The actuator arm 125 is rotated about a pivot by a voice coil motor (VCM) 120 to position the head 150 radially over the disk 160. The disk 160 comprises a number of radially spaced, concentric tracks 115. Each track 115 may be divided into a number of data sectors (not shown in FIG. 2) that are spaced circumferentially along the track 115. Each data sector may be addressed by a physical block address. The disk 160 may also comprise a plurality of angularly spaced servo wedges $122_0$-$122_N$, each of which may include embedded servo information that can be read from the disk 160 by the head 150 to determine the position of the head 150 over the disk 160.

To write data to the disk 160, the controller 10 may first position the head 150 at a desired track 115 on the disk 160 by sending a control signal input 128 (e.g., control current) to the VCM 120. The controller 10 may include a servo control system that positions the head 150 using the VCM 120 based on position information read from one or more servo wedges $122_0$-$122_N$. When the head 150 is properly positioned at the desired tack 115, the controller 10 may write the data to the disk 160 using the head 150. To read data from the disk 160, the controller 10 may first position the head 150 at a desired track 115 on the disk 160 using the VCM 120, and then read the data from the disk 160 using the head 150.

The controller 10 may write data to and read data from the disk 160 in response to write/read commands from the host. When the controller 10 receives a host write command including data to be written to the disk 160, the controller 10 may temporarily hold the data from the host in a buffer (e.g., DRAM) and then write the data from the buffer to the disk 160 using the head 150. The controller 10 may also update the address table with the LBA to PBA mapping for the data written to the disk 160. The controller 10 may notify the host that the write command has been completed after the data has been successfully written to the disk 160 or once the data has been received in the buffer.

In one embodiment, the write command may include a force unit access (FUA) bit. When the FUA in the write command is set, the controller 10 returns a write completion status to the host after the data has been successfully written to the disk 160 (i.e., after the data has been committed to the storage media). When the FUA is not set, the controller 10 may return a write completion status to the host once the data has been received in the buffer (cache).

When the controller 10 receives a host read command requesting data stored at certain LBAs, the controller 10 may look up the LBAs in the address table to determine the PBAs of the requested data on the disk 160. The controller 10 may then read the requested data from the PBAs on the disk 160, temporarily store the read data in the buffer and send the read data from the buffer to the host.

Figure 3:
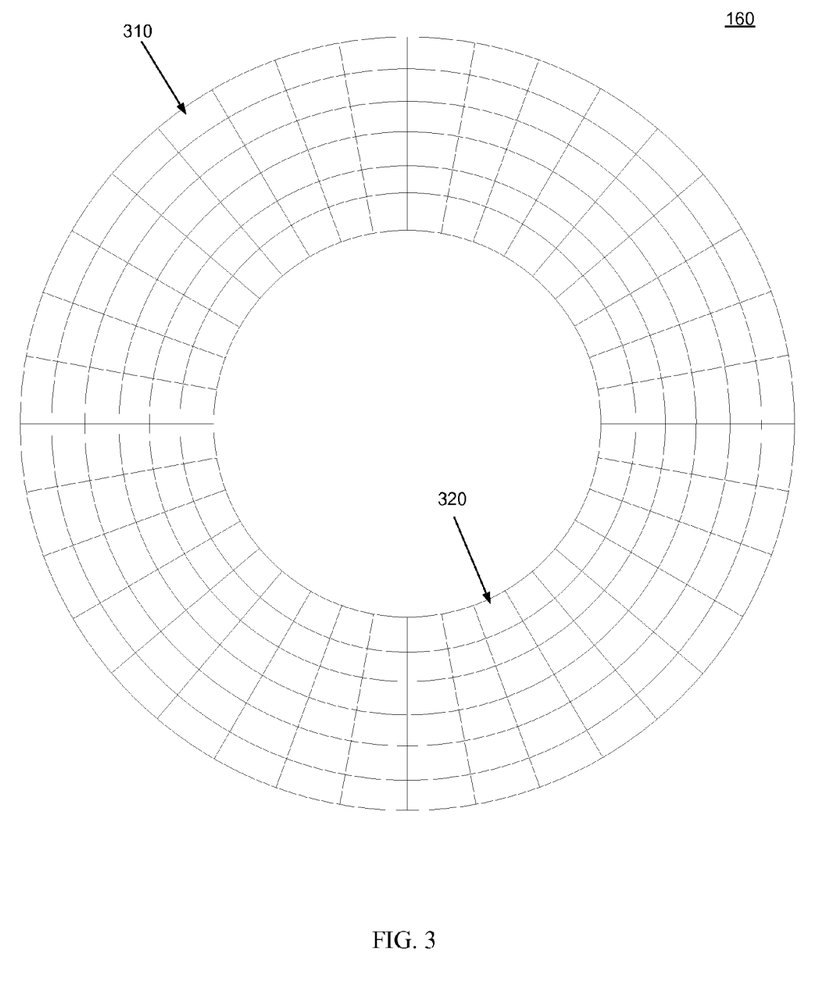
FIG. 3 shows an example of an old physical address and a new physical address on a disk for the same logical address according to an embodiment of the present invention.

As discussed above, the controller 10 may employ indirect addressing in which new data associated with an LBA is written to a new physical address instead of the same physical address as the old data associated with the LBA. An example of this is illustrated in FIG. 3, which shows a portion of a disk 160 comprising data sectors, where each data sector corresponds to a different PBA. In this example, when the host writes new data to an LBA, the controller 10 may write the new data to PBA 320 while leaving a "footprint" of the old data associated with the LBA at PBA 310, as shown in FIG. 3.

To ensure that a "footprint" of the old data is not left on the disk 160 according to an embodiment, when the host writes new data to the LBA, the controller 10 writes the new data to PBA 320 and removes the old data associated with the LBA from PBA 310. The controller 10 may remove the old data by overwriting the old data at PBA 310 with all ones, all zeros or a pattern of bits. The controller 10 may determine the PBA 310 of the old data by looking up the old PBA 310 for the LBA in the address table before updating the address table with the new PBA 320 for the LBA.

In an embodiment, the controller 10 may wait until the old data at PBA 310 is removed from the disk 160 before sending a write completion status to the host. In another embodiment, the controller 10 may indirectly indicate to the host that the old data at PBA 130 has been removed. For example, the controller 10 may make acceptance of a subsequent write command from the host conditioned upon the old data at PBA 130 being removed. In this example, the host interprets acceptance of the subsequence write command as an indication that the old data corresponding to the previous command has been removed.

An example of a disk writing scheme employing indirect addressing is shingle writing. In shingle writing, data is sequentially written to the disk 160 in one direction. The direction may be from the outer diameter (OD) to the inner diameter (ID) of the disk 160 or the opposite direction. Shingle writing allows the disk drive 200 to write narrower tracks 115, and hence increase the storage capacity of the disk 160, without reducing the dimensions of the head 150.

Figure 4A:
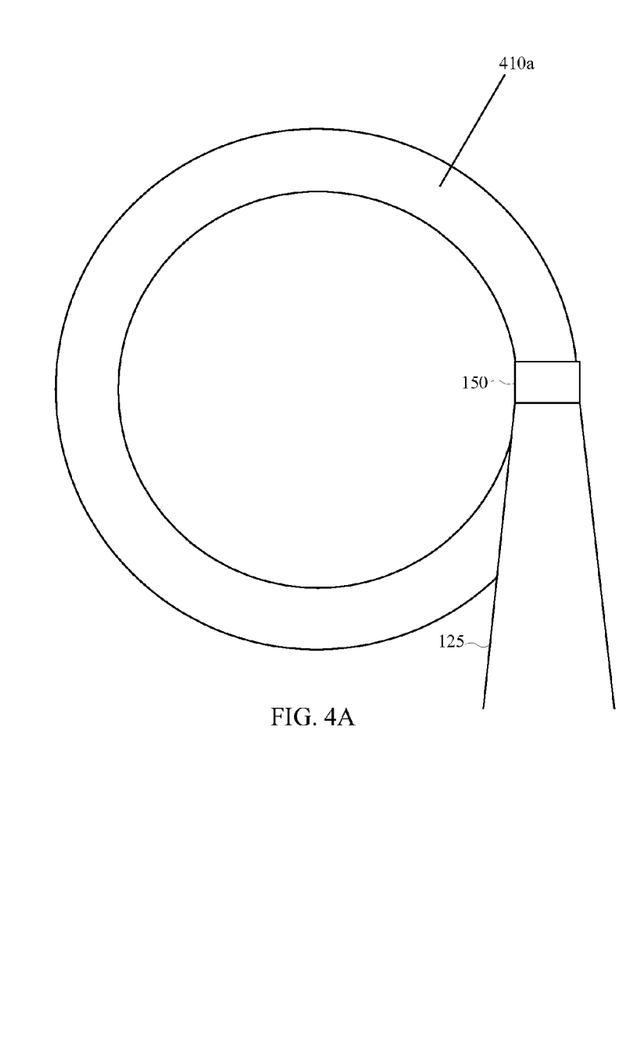
FIGS. 4A-4D show an example of shingle writing according to an embodiment of the present invention.
Figure 4B:
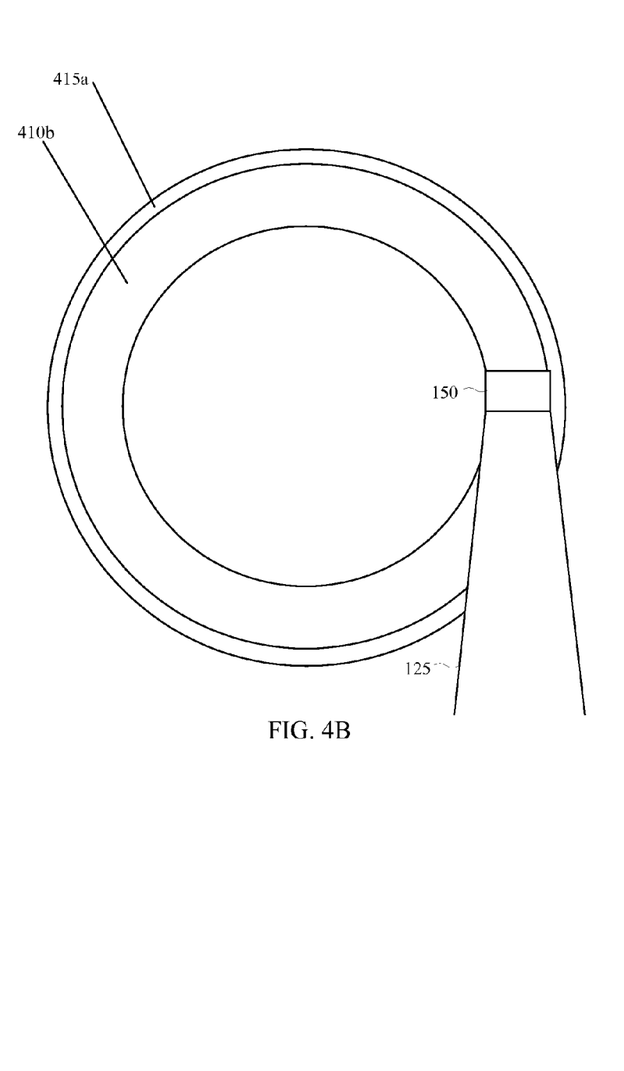
Figure 4C:
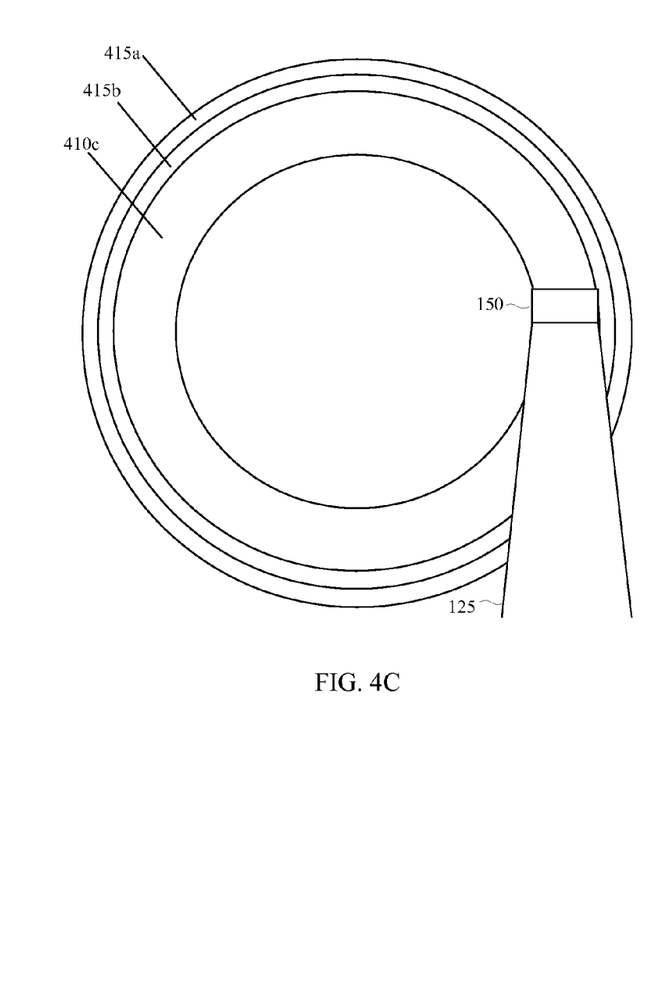
Figure 4D:
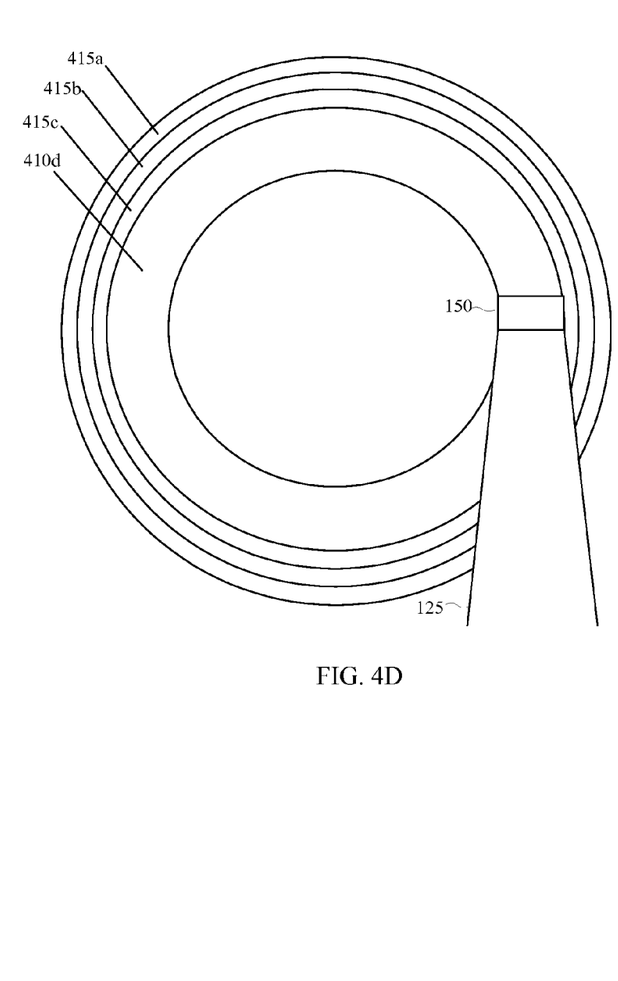

An example of shingle writing is illustrated in FIGS. 4A-4D, which shows the progression of a shingle write to the disk 160. In FIG. 4A, the head 150 writes data to the disk 160 in a first circular band 410a. In FIG. 4B, the head 150 is offset by a small amount from its position in FIG. 4A. The head 150 then writes subsequent data to the disk 160 in a second circular band 410b. The second circular band 410b overlaps and overwrites most of the first circular band 410a, leaving a narrow portion of the first circular band 410a that defines a first narrow track 415a. In FIG. 4C, the head 150 is offset again and the head 150 writes subsequent data to a third circular band 410c. The third circular band 410c overlaps and overwrites most of the second circular band 410b, leaving a narrow portion of the second circular band 410b that defines a second narrow track 415b. In FIG. 4D, the head 150 is offset again and the head 150 writes subsequent data to a fourth circular band 410d. The fourth circular band 410d overlaps and overwrites most of the third circular band 410c, leaving a narrow portion of the third circular band 410c that defines a third narrow track 415c. This process may be repeated to write a sequence of data on the disk 160. Thus, shingle writing allows the disk drive 200 to write narrower tracks for given head dimensions.

In shingle writing, when the host writes new data to an LBA, the controller 10 writes the new data to a new PBA on the disk 160 instead of the PBA of the old data associated with the LBA. As a result, a copy or "footprint" of the old data is left on the disk 160. A challenge in removing the old data for a shingle write is that the old data can not be overwritten without overwriting data in adjacent tracks. This is because the head 150 writes data in a wide band 410 compared with the narrow tracks 415 that result from shingle writing. As a result, the head 150 can not overwrite a single track 415 without overwriting adjacent tracks 415.

An embodiment for removing the old data for a shingle write will now be described. In this embodiment, after the controller 10 has located the PBA of the old data to be removed, the controller 10 may perform garbage collection within a circular band of the disk 160 containing the old data. The circular band may have a similar width as a circular band written by the head 150 and may span a plurality of tracks 415.

The controller 10 may perform the garbage collection by reading valid data from the disk 160 within the circular band and temporarily storing the read valid data in a buffer. Data at a particular PBA may be considered valid when the data is the most recent data written to the disk for the corresponding LBA. Data at a particular PBA may be considered invalid when newer data associated with the same LBA is stored somewhere else on the disk 160. The controller 10 may determine the physical address of the most recent data (valid data) for a given LBA by looking up the current PBA mapped to the LBA in the address table. After storing the valid data in the buffer, the controller 10 may coalesce the valid data and rewrite the valid data to a different physical location on the disk 160.

After reading the valid data within the circular band containing the old data, the controller 10 may overwrite the circular band to overwrite the old data, and hence remove the old data from the disk 160. Since the valid data within the circular band is read and rewritten to a new physical location on the disk 160, the overwrite by the head 150 does not also remove the valid data from the disk drive 200. Thus, the controller 10 may perform garbage collection before removing the old data from the disk 160 to preserve valid data in the vicinity of the old data. The old data may be removed while the valid data is in the buffer or after the valid data has been rewritten to the new physical location on the disk 160.

Although embodiments of the present invention have been discussed above using the example of a disk 160, it should be appreciated that embodiments of the present invention can also be applied to other types of storage media.

For example, in one embodiment, the storage media 20 may include a non-volatile semiconductor memory. The non-volatile semiconductor memory may comprise an array of memory cells (e.g., NAND-based memory cells) for storing data, where each memory cell is capable of storing one bit or multiple bits. In this embodiment, the storage media 20 may include circuitry for writing data to and reading data from the memory cells and erasing the memory cells under the direction of the controller 10. Data may be stored in the memory cells by charging and/or discharging floating gates in the memory cells.

Figure 5:
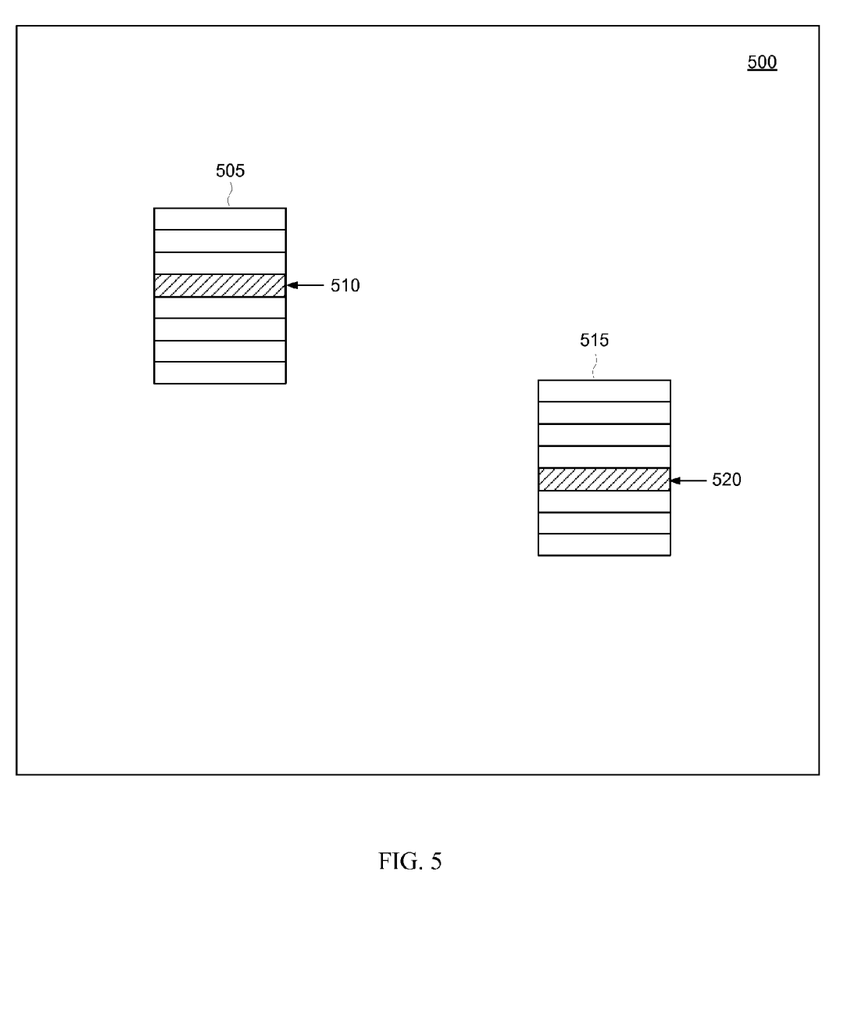
FIG. 5 shows an example of an old physical address and a new physical address in a non-volatile semiconductor memory for the same logical address according to an embodiment of the present invention.

The non-volatile semiconductor memory may be partitioned into a plurality of blocks, and each block may be further partitioned into a plurality of pages. Each page may store data corresponding to one or several LBAs. FIG. 5 shows an example of two blocks 505 and 515 in a non-volatile semiconductor memory 500. In this example, each block 505 and 515 comprises eight pages for ease of illustration. One skilled in the art will appreciate that a block may comprise any number of pages. In one embodiment, the controller 10 may write data to and read data from individual pages in the non-volatile semiconductor memory. The controller 10 may maintain an address table providing LBA to page address mapping for data stored in the non-volatile semiconductor memory.

The controller 10 may also erase the memory cells in the semiconductor memory in blocks. For example, a block may be erased by discharging all of the memory cells in the block. In the erased state, all of the memory cells in the block may have the same default bit value (e.g., all zeros). For example in which the default bit value is zero after erasure, data is written to the memory cells of the erased block by programming memory cells (e.g., charging the memory cells) corresponding to the ones in the data.

In one embodiment, the controller 10 may employ indirect addressing, in which new data associated with an LBA is written to a new physical address (e.g., new page) in the non-volatile semiconductor memory 500 instead of the same physical address as the old data associated with the LBA. An example of this is illustrated in FIG. 5. In this example, when the host writes new data to an LBA, the controller 10 may write the new data to a new page 520 in block 515 while leaving a "footprint" of the old data associated with the LBA at an old page 510 in block 505.

To prevent leaving a "footprint" of the old data according to an embodiment, when the host writes new data to the LBA, the controller 10 writes the new data to the new page 520 and removes the old data associated with the LBA from the old page 510. The controller 10 may remove the old data by overwriting the old data in the old page 510 with all zeroes, all ones or a pattern of bits. If the default bit value of a page after erasure is all zeroes, then the controller 10 may remove the old data from the old page 510 by programming the corresponding memory cells to all ones (e.g., the opposite bit value from the default bit value after erasure), and vice versa. The controller 10 may determine the physical address of the old data by looking up the page address in the address table for the LBA before updating the address table with the new page address for the LBA.

In one embodiment, the controller 10 may remove the old data by performing garbage collection for the block containing the old data and then erasing the block. The controller 10 may perform the garbage collection by reading valid data from the block containing the old data and temporarily storing the read valid data in a buffer. Data at a particular page may be considered valid when the data is the most recent data written to the non-volatile semiconductor memory for the corresponding LBA. After storing the valid data in the buffer, the controller 10 may coalesce the valid data and rewrite the valid data to a different physical location (e.g., different block) in the non-volatile semiconductor memory.

After the valid data in the block containing the old data has been read, the controller 10 may erase the block to remove the old data from the non-volatile semiconductor memory. The garbage collection in this embodiment allows the controller 10 to erase the old data without losing the valid data in the block. The controller 10 may also perform garbage collection to free up blocks in the non-volatile semiconductor memory as part of the controller's data management functions.

Figure 6:
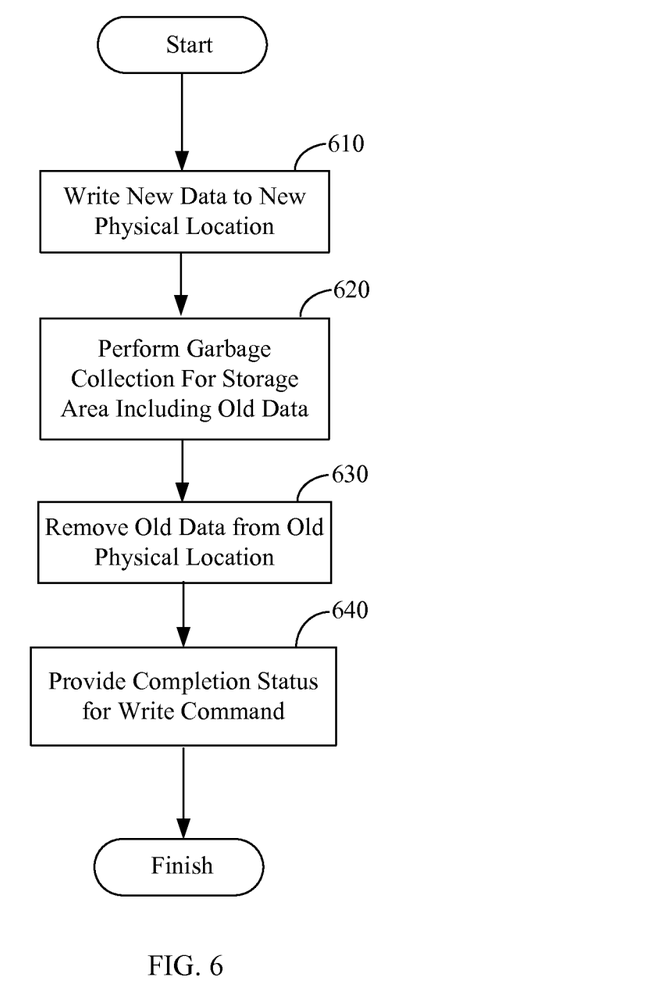
FIG. 6 is a flow diagram of a method of secure writing on a storage media according to an embodiment of the present invention.

FIG. 6 illustrates a method of performing a secure write when a write command is received according to an embodiment of the present invention. The steps in FIG. 6 may be performed by the controller 10.

In step 610, new data associated with an LBA in the received write command is written to a new physical address (e.g., new PBA) on the storage media 20.

In step 620, garbage collection is performed for a storage area of the storage media 20 including the old data associated with the same LBA as the new data. The old data is stored at an old physical address that is different from the new physical address of the new data. For the example of shingle writing in a disk drive, the storage area may include a plurality of tracks on the disk 160. For the example of non-volatile semiconductor memory, the storage area may correspond to a block containing the old data. As discussed above, garbage collection may be performed to retain valid data in the vicinity of the old data to be removed. Step 620 may be skipped in cases where the old data can be removed from the storage media 20 without removing valid data in the vicinity of the old data.

In step 630, the old data is removed from the storage media 20. The old data may be removed by overwriting the old data with all ones, all zero or a pattern of bits. For the example of non-volatile semiconductor memory, the old data may also be removed by erasing the block containing the old data. As result of removing the old data from the storage media 20, a "footprint" of the old data is not left on the storage media 20.

In step 640, a write completion status is sent to the host for the received write command informing the host that the new data has been successfully written to the storage media 20 and the old data associated with the same LBA as the new data has been removed from the storage media 20.

It should be appreciated that the order of the steps in FIG. 6 are exemplary only and may be changed. For example, step 610 may be performed after step 620 or step 630.

The host may control whether the old data is removed from the storage media 20. In an embodiment, the host may specify in a write command to the data storage device 100 whether to remove the old data from the storage media 20. In this embodiment, a write secure bit may be added to the write command to indicate whether to remove the old data. The write secure bit may be similar to the FUA bit, discussed above. When the write secure bit is set, the controller 10 may write the new data in the write command to the storage media and remove the corresponding old data from the storage media 20. The host may set the write secure bit to ensure that a "footprint" of the old data is not left on the storage media 20. In this example, the controller 10 may wait until the old data has been removed from the storage media 20 before returning a write completion status to the host. When the write secure bit is not set, the controller 10 may write the new data in the write command to the storage media 20 without removing the old data from the storage media 20. For example, the host may decide not to set the write secure bit for data with a low security level or when higher write performance is desired for non-sensitive data.

In an embodiment, the controller 10 may have a secure write mode that can be enabled by the host. When the secure write mode is enabled and the controller 10 receives a write command, the controller 10 may write the new data in the write command to the storage media 20 and remove the old data associated with the same LBA as the new data from the storage media 20. In this mode, the controller 10 may wait until the old data has been removed from the storage media 20 before returning a write completion status to the host. When the secure write mode is disabled and the controller 10 receives a write command, the controller 10 may write the new data in the write command to the storage media 20 without removing the old data from the storage media 20. In this mode, the controller 10 may return a write completion status to the host when the data has been successfully written to the storage media or received in the buffer. The host may enable and disable the secure write mode by sending commands to the controller 10.

For the purposes of the present specification, it should be appreciated that the terms "processor", "microprocessor", and "controller", etc., refer to any machine or collection of logic that is capable of executing a sequence of instructions and shall be taken to include, but not be limited to, general purpose microprocessors, special purpose microprocessors, central processing units (CPUs), digital signal processors (DSPs), application specific integrated circuits (ASICs), multi-media controllers, signal processors and microcontrollers, etc.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A data storage device configured for shingled data writing, comprising:
   a storage media including a disk; and
   a controller configured to:
      receive a write command including a logical address and new user data associated with the logical address;
      write the new user data to a new physical address on the storage media;
      determine an old physical address associated with the logical address, the old physical address containing old user data associated with the logical address;
      identify a circular band of the disk comprising a track including the old physical address and one or more adjacent tracks;
      perform garbage collection on the circular band in response to the receipt of the write command at least in part by reading valid data stored in the one or more adjacent tracks of the circular band, temporarily storing the valid data in a buffer, and rewriting the valid data to a different physical location of the disk;
      overwrite the circular band including the old user data after said performing garbage collection; and
      send a write completion status associated with the write command to a host only after determining that said writing the new user data to the new physical address, said rewriting the valid data in the buffer to a different physical location of the disk, and said overwriting the circular band including the old user data were successful;

wherein the new physical address and the old physical address are different.

2. The data storage device of claim 1, wherein the controller is further configured to coalesce the valid data after reading the valid data stored in the one or more adjacent tracks of the circular band and before rewriting the valid data to the different physical location of the disk.

3. The data storage device of claim 1, wherein the storage media further comprises non-volatile semiconductor memory.

4. The data storage device of claim 1, wherein the controller is further configured to maintain an address table mapping logical addresses to physical addresses and update the address table to reflect an association between the logical address and the new physical address after identifying the circular band.

5. The data storage device of claim 1, wherein the controller is further configured to overwrite the old user data when a secure write setting in the controller is enabled by the host.

6. The data storage device of claim 1, wherein the controller is further configured to overwrite the old user data when the write command includes a secure write command.

7. A method of secure writing on a storage media including a disk, the method comprising:

receiving a write command from a host including a logical address and new user data associated with the logical address;

writing the new user data to a new physical address on a storage media including a disk;

determining an old physical address of the storage media associated with the logical address, the old physical address containing old user data associated with the logical address;

identifying a circular band of the disk comprising a track including the old physical address and one or more adjacent tracks;

performing garbage collection on the circular band in response to receiving the write command at least in part by reading valid data stored in the one or more adjacent tracks of the circular band, temporarily storing the valid data in a buffer, and rewriting the valid data to a different physical location of the disk;

overwriting the old user data in the circular band after said performing garbage collection; and sending a write completion status associated with the write command to a host only after determining that said writing the new user data to the new physical address, said rewriting the valid data in the buffer to a different physical location of the disk, and said overwriting the old user data in the circular band were successful;

wherein the new physical address and the old physical address are different.

8. The method of claim 7, wherein the storage media further comprises non-volatile semiconductor memory.

9. The method of claim 7, wherein the overwriting the old user data is performed when a secure write setting in a controller associated with the storage media is enabled by the host.

10. The method of claim 7, wherein the overwriting the old user data is performed when the write command includes a secure write command.

* * * * *